United States Patent [19]

Collins et al.

[11] Patent Number: 5,594,642

[45] Date of Patent: Jan. 14, 1997

[54] INPUT METHODS FRAMEWORK

[75] Inventors: Leland D. Collins, Palo Alto; Judy Lin, San Jose, both of Calif.

[73] Assignee: Object Technology Licensing Corp., Cupertino, Calif.

[21] Appl. No.: 653,067

[22] Filed: May 31, 1996

Related U.S. Application Data

[63] Continuation of Ser. No. 171,591, Dec. 22, 1993, abandoned.

[51] Int. Cl.$^6$ .............................. G06F 17/20; G06F 3/14; G06F 17/21
[52] U.S. Cl. .............................. 395/797; 395/12; 395/62; 395/798
[58] Field of Search .................... 364/419.02, 419.03, 364/419.04, 419.08, 419.09, 419.1, 419.16; 395/12, 62

[56] References Cited

U.S. PATENT DOCUMENTS

| | | | |
|---|---|---|---|
| 4,408,199 | 10/1983 | White et al. | 345/129 |
| 4,531,119 | 7/1985 | Nakayama et al. | 345/171 |
| 4,544,276 | 10/1985 | Horodeck | 400/110 |
| 4,602,878 | 7/1986 | Merner et al. | 400/110 |
| 4,774,666 | 9/1988 | Miyao et al. | 364/419.02 |
| 4,791,587 | 12/1988 | Doi | 364/419.02 |
| 4,814,988 | 3/1989 | Shiotani et al. | 364/419 |
| 4,821,220 | 4/1989 | Duisberg | 364/578 |
| 4,885,717 | 12/1989 | Beck et al. | 395/775 |
| 4,891,630 | 1/1990 | Friedman | 345/156 |
| 4,953,080 | 8/1990 | Dysart et al. | 395/600 |
| 5,041,992 | 8/1991 | Cunningham et al. | 395/135 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,088,038 | 2/1992 | Tanaka et al. | 364/419.02 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,164,900 | 11/1992 | Bernath | 364/419.09 |
| 5,181,162 | 1/1993 | Smith et al. | 364/419.19 |
| 5,212,638 | 5/1993 | Bernath | 364/419.09 |
| 5,214,583 | 5/1993 | Miike et al. | 364/419.04 |
| 5,339,433 | 8/1994 | Frid-Nielsen | 395/700 |
| 5,386,568 | 1/1995 | Wold et al. | 395/700 |

OTHER PUBLICATIONS

Booch; *Object–Oriented Analysis and Design With Applications Second Edition;* The Benjamin/Cummings Publishing Company; 1994; pp. 171–228.

Waldo; "A New Generation"; *UNIX Review;* v6 n8; p32(7); Aug. 1988; Dialog: File 275, Acc#01248012.

Franz; "Writing Filters in an Object–oriented Language; Object–oriented Programming with Actor Makes Writing Filter–type Programs Easy"; *Dr. Dobb's Journal;* v14 n12; p28(9); Dec. 1989; Dialog: File 275, Acc#01320897.

Knaus; "Message Passing in Prolog"; *AI Expert;* v5 n5; p21(6); May 1990; Dialog: File 275, Acc#01357228.

(List continued on next page.)

*Primary Examiner*—Donald E. McElheny, Jr.
*Assistant Examiner*—Stephen R. Tkacs
*Attorney, Agent, or Firm*—Bookstein & Kudirka

[57] ABSTRACT

A method and system for assisting input of information. The method and system dynamically translates information being input, and allows user interaction with the translation process. The system is flexibly designed to allow easy use by application developers and users. The design allows a common input method to be used by multiple applications. Users may also customize the input methods to suit their own needs. The input methods support "active" areas of text input, character based input, and phrase based input. The active area can be customized to appear a certain way. Dictionaries are also supported, including optional properties such as grammar and frequency. Dictionaries may also be chained.

5 Claims, 12 Drawing Sheets

OTHER PUBLICATIONS

Ford et al.; "Apple's New Technology and Publishing Strategies"; *MacWeek;* v6 n34; p38(4); Sep. 28, 1992; Dialog: File 275, Acc#01536925.

Nierstrasz et al.; "Component–oriented Software Development"; *Communications of the ACM;* v35 n9; p160(6); Sep. 1992; Dialog: File 275, Acc#1536391.

Beethe et al.; "A Visual Engineering Environment for Test Software Development"; *Hewlett–Packard Journal;* v43 n5; p72(6); Oct. 1992; Dialog: File 275, Acc#01539326.

MacApp 2.0 Tutorial; Apple Computer, Inc.; copyright 1989.

Guide to MacApp Tools (for MacApp 3.0); Apple Computer, Inc.; copyright 1992.

Programmer's Guide to MacApp; Apple Computer, Inc.; copyright 1992.

| FAKE LOGOGRAPH | ENGLISH | CHINESE LOGOGRAPH |
|---|---|---|
| 1 | a/an | 一 |
| 옷 ⌂ | neighbor (man/house) | 鄰居 (side/dwell) |
| 🚪 | read | 讀 |
| 웃 | she/her | 她 |
| ✉ | address | 地址 (ground/location) |

Figure 2

| TYPE-IN | SCREEN DISPLAY | READING |
|---|---|---|
| u | 1 | A |
| un | 1 | An |
| una | 1 a | A· na |
| unay | 1 🐴 | A· neigh |
| unayb | 1 🐴 b | A· neigh-b |
| unaybu | 1 🐴 bu | A· neigh-bo |
| unaybur | 🧍🏠 | A· neighbor |
| unayburr | 🧍🏠 r | A· neighbor-r |
| unayburre | 🧍🏠 re | A· neighbor-re |
| unayburred | 🧍🏠🦷 | A· neighbor· red |
| . . . | | . . . |
| unayburredhur | 🧍🏠🦷♀ | A· neighbor· red· her |
| . . . | | . . . |
| unayburredhurudres | 🧍🏠📕♀ 1 👗 | A· neighbor· read· her · dress |

zhang3  長 chang2  長

INPUT METHODS FRAMEWORK

This is a continuation, of application Ser. No. 08/171,591, filed Dec. 22, 1993, now abandoned.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention generally relates to improvements in computer systems, and more particularly to a system and method for processing text input.

BACKGROUND OF THE INVENTION

Technology has broken down many of the distance barriers previously encountered by business and society in general. Global communication has provided unprecedented immediacy of information in most forms. This has provided a corresponding level of exposure of cultures and events. While much of the communication which takes place is in the universal language of images, there remains a large segment of communication and correspondence which requires various levels of translation.

Computer technology has made possible electronic processing of information in a variety of languages, which includes electronically assisting in the translation of language. Many devices have been devised to assist in entering international information into documents, and creating documents which are not in the native language of the user creating the document. These devices are rigidly designed utilizing a self-contained unit of software. In other words, the use of the translating equipment is limited to the software itself. This inflexibility leads to a somewhat limited use of the equipment, and correspondingly limits the supported environments.

In environments where a user inputs information, there is a need for a more flexible structure to overcome the limitations discussed above with respect to language processing.

SUMMARY OF THE INVENTION

Accordingly, it is a primary object of the present invention to provide a system and method for overcoming the problems mentioned above with respect to translating and assisting in translating information.

It is a further object of the present invention to provide a flexible system and method for assisting a user in developing information in a form which the user is not familiar with.

It is still another object of the present invention to provide a system and method which allows multiple applications to incorporate a common standardized input method in a flexible manner.

It is another object of the present invention to provide a system and method for providing a single extensible object oriented input method.

These and other objects are realized by an object oriented input method framework which provides a variety of useful tools to assist a user in the input of information. The system includes objects for receiving user input, translating the input, allowing the user to modify the translation, and confirm that a translation is acceptable.

The input methods of the present invention can advantageously be at the system level, which allows easy incorporation by application developers.

The input methods of the present invention can also be selected and modified by the user in order that each user customizes aspects of the input method framework to their own needs. The present system allows users to buy off the shelf components of input methods to further customize their input method system. A preferred embodiment supports advanced features such as multiple active input areas, integrated undo, attaching phonetic information to text, and managing multiple input methods.

These and other objects and advantages will become evident from the specification and claims which follow.

BRIEF DESCRIPTION OF THE DRAWINGS

FIG. 2 illustrates an example of an ideographic sentence;

FIG. 3 shows a typing sequence and the display corresponding to the typing sequence;

FIGS. 7a, 7b and 7c illustrate various conversion examples;

DETAILED DESCRIPTION OF THE INVENTION

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

Parts of the discussion below give examples which are specific to a certain translation. As outlined above, however, the principles disclosed herein are applicable in virtually any environment in which a user is inputting information. The present invention is transparent with respect to the types of information being handled. One goal of the present system is to provide a flexible input system for virtually any data type.

The history of object-oriented programming and the developments of frameworks is well-established in the literature. C++ and Smalltalk have been well-documented and will not be detailed here. Similarly, characteristics of objects, such as encapsulation, polymorphism and inheritance have been discussed at length in the literature and patents. For an excellent survey of object oriented systems, the reader is referred to "Object Oriented Design With Applications" by Grady Booch.

While many object oriented systems are designed to operate on top of a basic operating system performing rudimentary input and output, the present system is used to provide system level support for particular features. It should be kept in mind, however, that innovative objects disclosed herein may also appear in layers above the system level in order to provide object support at different levels of the processing hierarchy.

Figure 1:
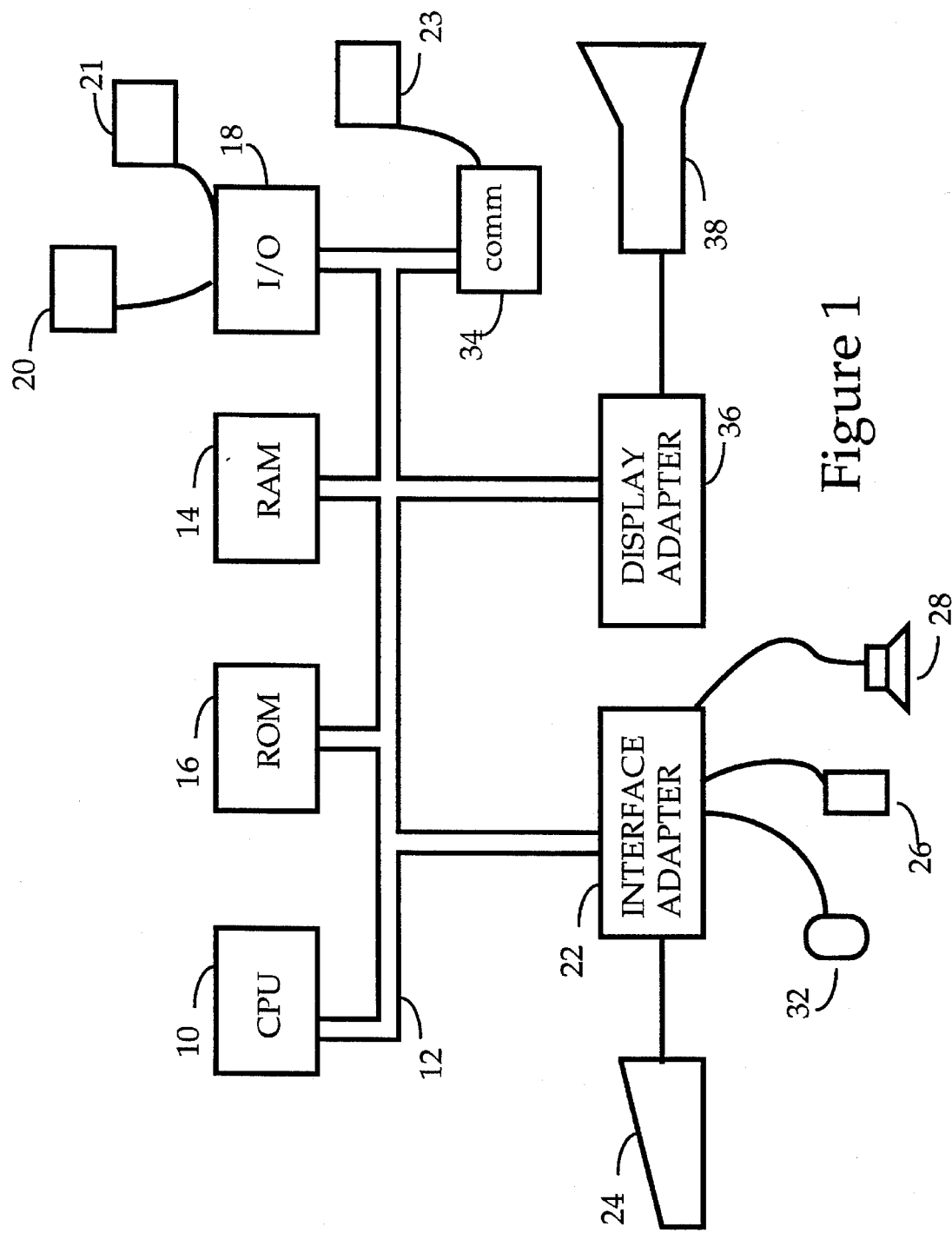
FIG. 1 illustrates a typical hardware configuration of a computer in accordance with the subject invention.

The invention is preferably practiced in the context of an operating system resident on a personal computer such as the IBM ® PS/2 ® or Apple ® Macintosh ® computer. A representative hardware environment is depicted in FIG. 1, which illustrates a typical hardware configuration of a computer in accordance with the subject invention having a central processing unit 10, such as a conventional microprocessor, and a number of other units interconnected via a system bus 12. The computer shown in FIG. 1 includes a Read Only Memory (ROM) 16, a Random Access Memory (RAM) 14, an I/O adapter 18 for connecting peripheral devices such as disk units 20 and other I/O peripherals represented by 21 to the system bus 12, a user interface adapter 22 for connecting a keyboard 24, a mouse 32, a speaker 28, a microphone 26, and/or other user interface devices such as a touch screen device (not shown) to the bus 12, a communication adapter 34 for connecting the workstation to a data processing network represented by 23. A display adapter 36 for connecting the bus to a display device 38. The workstation has resident thereon an operating system such as the Apple System/7 ® operating system.

An input method provides a mechanism for converting keyboard characters to ideograms: generally the Chinese characters used East Asian writing. Since the repertoire for such a character set numbers in the thousands, it is not possible to type each character directly. Instead, the keyboard generates a small number of components, e.g., radicals or phonetic symbols, and an input method converts them into the appropriate ideograms. Examples of phonetic symbols include kana for Japanese, hangul for Korean, and bopomofo or the English alphabet for Chinese.

The preferred embodiment disclosed herein describes external interfaces of what will be referred to as the "Input Method Framework." The following discussion offers some background information for those unfamiliar with ideographic input, summarizes the features, identifies the goals that drive the design, provides detailed description of the framework classes, and uses object diagrams to describe some common scenarios.

Imagine for a moment that English were written with logographs. Each separate word or syllable was represented by a separate picture, and is written without spaces. The number of words is clearly too large to represent on a keyboard, and additional processing is needed to input characters.

The most popular method allows the user to type in characters in a phonetic transcription, which is automatically translated into ideograms (other techniques—including handwriting analysis in conjunction with pen input—are also possible, and can be used in addition). Let's suppose that we wanted to enter an ideographic sentence having the artificial logographs listed in the Fake Logograph column of FIG. 2.

The artificial logographs in this example are the in the table of FIG. 2. We also include real Chinese logographs for comparison.

FIG. 3 shows the typing in sequence. We would type our desired sentence in phonetically as: unayburredhurudres (remember that there are no spaces!). As we type, the input method parses the text grammatically, and converts phrases to the corresponding ideograms. Since there may be a number of renderings, the text changes as we type.

Even once the sentence is complete, the ideograms are not correct. It requires additional knowledge beyond syntax to get a correct result, since syntactically both the forms: Det.·Noun·Verb·In. Object·Det.·Noun, e.g. "A neighbor read her a book", and Det.·Noun·Verb·Pos. Pronoun·Noun, e.g. "A neighbor read her address" are syntactically correct. So, the user needs to modify the transcription by choosing alternative renderings.

This task is done by either modifying the phrase length (in this case, indicating that udres is one word), or by selecting an alternative ideogram (e.g. manually choosing the book ideogram instead of the apple ideogram).

Unfortunately, most sentences are much more complex than this example—especially in Japanese—and have many more alternative phrase lengths and alternative readings. The number of homophones (ideograms with the same pronunciation) in Japanese and Chinese are very large: up to one hundred readings for the same symbol! Even when alternatives are chosen, the input method uses its knowledge of the grammatical structure of the sentence to filter out inappropriate options; otherwise the user would be swamped. (The user can choose to see all options for unusual readings.)

Inline Input: Japanese Example

Figure 4:
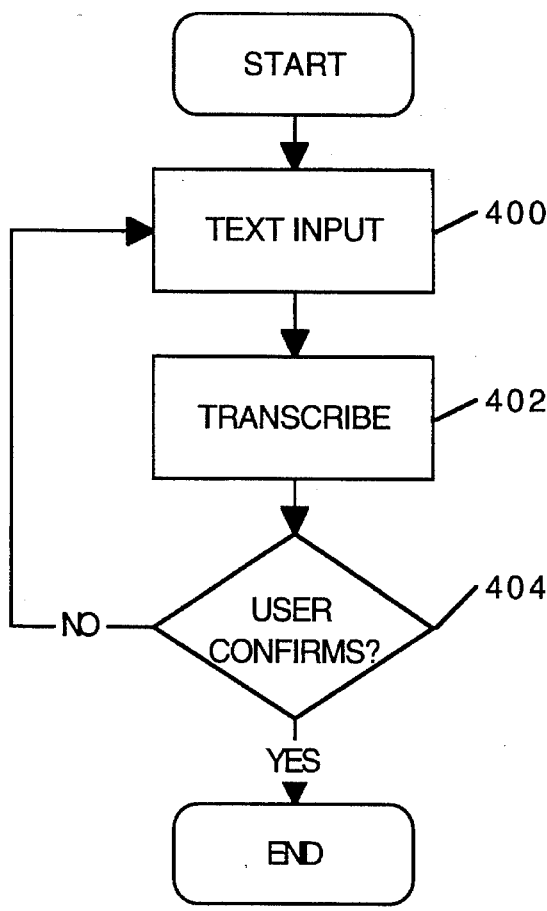
FIG. 4 is a flowchart demonstrating the overall process of text input.

FIG. 4 is a flowchart demonstrating the overall process of text input. Text editing classes can use an input method to provide inline input, where the text is entered and converted directly in the document (as opposed to in a separate popup window). As the user types, text is displayed in the active area. The newly entered text should be visually distinct from the rest of the document so that the user can see which text is being processed. As typing continues, the contents of the active area changes. For example, romaji input is transcribed into kana by transliterators, and new phrases are identified and converted by the input method. When the user is satisfied with the conversion results, he confirms the text and collapses the active area.

At any given time, there are a number of different kinds of text on the screen:

Confirmed Text: Text that has already be confirmed and is no longer processed by the input method.

Converted Text: Text for which the input method has returned a result. This text is still within the active area and can be adjusted through the input method.

Raw Text: Unconverted text in the active area, generally phonetic characters.

Figure 5:
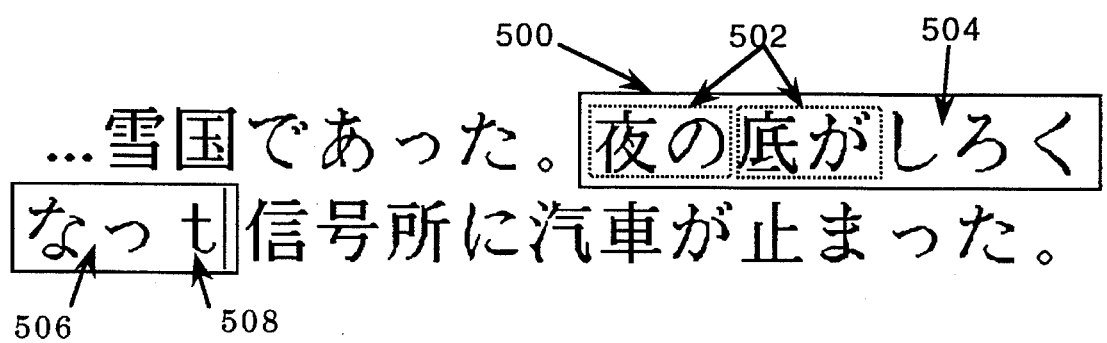
FIG. 5 shows what Japanese inline input might look while in progress.

FIG. 5 shows what Japanese inline input might look while in progress. The active input area 500 is outlined with a solid box. Notice that it starts in the middle of the first line and ends in the middle of the second line. The text outside of the active area does not participate in the conversion process. The dotted boxes denote phrases, or segments 502, which have already been converted. There are also unconverted, but transcribed, kana characters 504, 506, which are followed by a single romaji letter 508. The insertion point is after the romaji letter.

Input Method Operations

Figure 6:
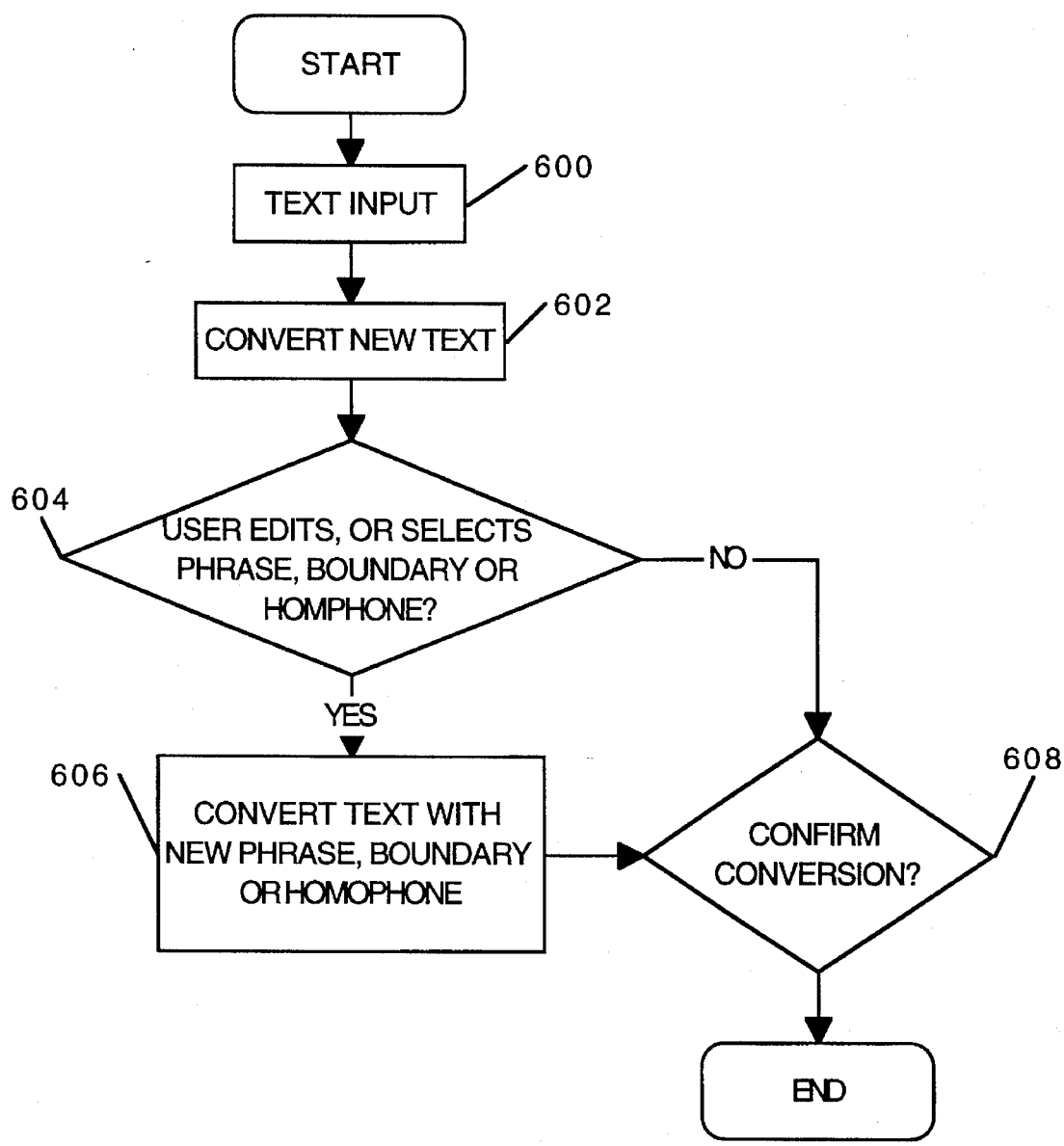
FIG. 6 demonstrates the processing of text using various input methods.

This section describes some other operation a user may need to use when typing Japanese sentences. FIG. 6 demonstrates the processing of text using various input methods. The general process involves input of text 600, conversion of the text, which is shown to the user at 602, user interaction with the text at 604, and either converting the text with the user selections at 606, and confirming the conversion process 608.

Select phrase. First, the user must indicate which phrase is to be adjusted. This could be done by pointing at the phrase with the mouse, or by typing some sequence of commands, such as the left and right arrow keys. However the phrase is selected by the user, it must be given a visual appearance different from the rest of the document text, and the rest of the text in the active area.

Change phrase boundary. The user can change the segmentation by indicating that a phrase should be made longer or shorter. (Note that this makes the following phrase shorter or longer, and is thus the same as moving the phrase boundary.) This could be done by dragging the phrase boundary with the mouse, or by typing some sequence of commands, such as the tip and down arrow keys. Depending upon the particular input method, changing the length of a phrase may cause all the phrases following it to change as well.

Choose homophone. The user can display alternate homophones for a phrase by double-clicking on the phrase, or by typing some sequence of commands, like the enter key. Alternatives can be selected either by changing to the next homophone in-place, or by bringing up a floating window displaying all homophones, from which the user would then choose the correct homophone.

Confirm conversion. The user can indicate-that conversion is complete by some command like return or enter. When this is done the distinctive visual appearance of the active area would be removed and the caret would be placed after the newly converted text.

Different levels of functionality could be supported by different input methods. For example if the user were to delete a character from the middle of a phrase, the information that an input method maintains to process the active area could become invalid. Thus some input methods may disallow such deletions. Most, however, allow the user to freely edit the un-converted input. Less sophisticated input methods might wait until the whole sentence is typed before doing any segmentation, while other input methods might generate phrases "on the fly". Some input methods might decide to "drop" phrases off the front of the active area as the user types in order to limit the amount of internal storage needed.

Input Method Dictionaries.

In order to support the conversion process described above, input methods make use of large dictionaries. These dictionaries typically provide the ability to make queries using a component key to lookup a result entry. For example, as lo shown in FIG. 7(*a*), in parsing the kana input for the sentence, "In Spring, Nagasaki" a Japanese input method engine might search one or more dictionaries using the component kana to determine which substrings of the input text are possible words. In many cases, one key will map to multiple entries (typically Chinese characters plus trailing kana results). For example, as shown in FIG. 7(*b*), the first two kana (ha, ru) map to entries 1, 2, and 3.

In the next phase, the input method might use grammatical information stored with each entry to find the most appropriate result for the given context. In the example above, the first entry, "Spring" is matched because it is a noun that can take the locative particle that follows it. The others are unlikely matches because of their grammatical categories.

Frequency information might also be used to weed out less likely options or to order the options for presentation to the user when the user wants to pick an option other than that chosen by the input method.

A single result might also be arrived at via different components, as shown in FIG. 7(*c*).

There are two primary categories of input method dictionaries: the main dictionary plus one or more user dictionaries. The dictionaries are large enough to account for typical language usage, but are seldom user-editable. The user dictionaries are designed specifically to be user editable so that the user can provide the input method with hints for selecting result characters that are better suited to the user's particular usage. Another type of user dictionary is a dictionary designed for use in specialized fields such as medicine, law, etc. These are generally treated the same as user dictionaries by the input method, but the developer might disallow user editing. Most input methods allow the user to select the dictionaries which will be searched and to determine the search order, with priority given to entries in the user dictionary over entries in the common dictionary.

Currently, dictionaries designed to work with one input method rarely work with any other input method. This prevents users from using their user dictionaries with different input methods. The primary clients of the Input Method Dictionary classes are developers of input methods. Other potential clients are developers of dictionaries for specialized fields such as law and medicine.

Goals and Features

Entering text with a keyboard is likely the least exciting yet most basic aspect of using a computer. English-speaking users take for granted the ability to type with a keyboard in exactly the same way, regardless of system or application context. Yet for many Chinese and Japanese users, the inability to input text in an efficient, consistent and intuitive manner stands as the biggest hurdle to effective computing.

The Input Method Framework's primary purpose is to address this problem by supporting system-level integration of input methods with other subsystems such as the Document Architecture, and the Typing Framework. It also provides base-level functionality including inline conversion, and the saving and restoring of component information. The framework supplies these services through a set of extensible objects. By adhering to the interface, an input method developer ensures that his product can be used for text editing throughout the system.

The following sections elaborates on primary and secondary design goals.

Primary Goals

The following points are fundamental ideas that drive the design.

Allow the user to buy off-the-shelf input method components and use them to enter text everywhere in the system. Imagine using one keyboard to type with the Finder, another for MacWrite, and yet another With Microsoft Word! This is currently the situation faced by Asian users.

Provide support for selecting and synchronizing input method. This control process can be very complex. For Japanese alone, there are five modes of input: kanji conversion, katakana, hiragana, half-width katakana and half-width hiragana. The situation is further complicated if the user uses other scripts like English. It will allow different input methods to be freely mixed without losing context information. For example, the user may wish to use a radical-based input method for a single character in the midst of kana→Kanji conversion. Switching to the radical-based method should preserve the phonetic method's context.

Provide a common dictionary access protocol to enable data sharing. Minimally, we must allow user-defined dictionaries to be shared by different conversion products. A common format would also enable special purpose dictionaries such as medical or legal dictionaries to be sold and marketed separately. There are numerous possible strategies which could be used to implement the dictionaries, including hardware-independent dictionaries. A different dictionary could be developed for every hardware target.

Provide full integration with Local Text and the Document Architecture. Integration with the local text system enables inline input throughout the system. Any developer who base his product on the local text automatically receives input method functionality.

Provide flexible undo support. Most current products do not support undo because 1) input methods are highly context sensitive, and it is difficult to undo an operation since it may be impossible to return to a previous state, and 2) it has not been clear where the responsibility lies between the application and the input method. We provide objects to facilitate undo implementation. The input method developer can use these objects to store information needed to retrieve previous context, and to subclass to customize undo behavior. One difficult problem is determining what constitutes an undo-able unit of typing when an input method is involved. That is, it must be determined with respect to each conversion result whether the conversion result could be considered separately undo-able. Requests such as selecting an option may or may not be considered undo-able. The entire typing sequence could be considered undo-able Supply human interface guidelines and examples for input method developers. Implement user interface elements with default behavior to promote consistency. The preferred embodiment will provide input method implementations with the system. These efforts can serve as examples for third party developers. Supplying a set of user interface elements that are common to all keyboard input methods, e.g., option window, status view, etc., is also contemplated. While the general goal is to provide a common interface, it is also possible to give the developer the choice of using the common interface in order that the developer not be deprived of the flexibility of using their own interface.

Achieve acceptable typing performance. Typing speed should not degrade noticeably when using an input method. Minimally, the speed should be sufficient for a data entry professional.

Allow existing conversion products to be easily ported without sacrificing architectural integrity. Input method developers are usually multi-platform suppliers, and their products are designed to be portable. Since users grow attached to their input methods, we want to accommodate existing products as long as we do not compromise the architecture.

Design the framework such that it is flexible enough to accommodate non-keyboard text entry such pen input or visual (i.e., point-and-click) radical-based input. The developer should not have to circumvent the framework to support other devices.

Interchangeable dictionaries: The dictionaries used for input methods should be usable by different input methods. Although a dictionary may be designed and optimized for a particular input method, the common protocol of the Input Method Dictionary classes will allow access by any input method. This feature is particularly desirable for user and specialized dictionaries, but should be usable with all input method dictionaries. Developers of specialized dictionaries should be able to implement their products knowing that they can be used by any input method.

Dictionary editing: The Input Method Dictionary classes will provide a protocol to support user and programmatic editing (adding, modification, and deletion of entries) of input method dictionaries.

Flexible dictionary search criterion: The entry lookup methods should permit flexible search criteria, including possibly the rise of regular expressions. For example, clients should be able to lookup entries in a Chinese dictionary with or without tones:

beijing=>1. bei3jing1 (北京) 2. bei4jing3 (背景)

Dictionary size: Because input method dictionaries contain a large amount of data, compression is often been a critical issue in how they are structured. While this is not an overriding concern, we will need to pay some attention to this issue.

2. Secondary Goals

Provide an extensible architecture that can be used by other linguistic services. The framework should accommodate other "plug-in" components such as spell checker, grammatical analysis tools or hyphenation engines. These services are usually batch oriented and can be implemented with commands in a straight forward manner. However, the input method architecture allows these operation to be invoked at text entry time.

Allow all text editing classes to use the input methods. Some developers may wish to write their own text editing classes. The framework should allow these clients transparent access to input method objects.

Support multiple active areas. Most products today only keep the context information for a single active area. If the user sets a different insertion point (even if it is in a different document), his previous input is confirmed and the states associated with that conversion area is lost. We want to support an arbitrary number of active areas over all documents. The framework is responsible for activating and deactivating the appropriate active area, and for coordinating between active areas and encapsulators.

Provide the ability to store and retrieve component information; maintain the consistency of this information during text editing. This support allows us to return confirmed text to an active state and be re-edited. It also provides the information necessary to support furigana, where phonetic information is displayed along side kanji characters. There are many possible ways to support furigana. One alternative is to store the component information as style runs. This has the advantage that keeping the phonetic in sync during editing is handled by the style mechanism. The disadvantage is that having so many style runs causes text display to slow down significantly.

Provide a generic input method human interface implementation that can be used with multiple conversion engines. It seems advantageous to have a single interface for entering all Chinese, Japanese and Korean text. However, current implementations all have a very tightly coupled relationship between the conversion engine and the input method interface; so this goal may be difficult for existing products. In any event, this generic input method will serve as our example for human interface design.

Provide a set of styles that developers can use to denote text in different conversion states. Which styles to use will also be included in the human interface guidelines.

3. Other Goals

User interface for selecting input methods. While this design provides the API for selecting and synchronizing multiple input methods, another Framework will be relied on to determine the user interface. The present embodiment could be designed to include this feature.

Implement conversion engines. Conversion engines require a great deal of expertise in language and grammar syntax. This task is probably best left to third party developers with such knowledge. Several conversion methods could be included with the system, and they could be ported from an existing implementation.

Improve conversion accuracy.

Supply input method dictionaries. Again, this task is probably a third party opportunity. The present embodiment does contemplate a Chinese phrase-level dictionary. A good dictionary makes Chinese conversion relatively straight forward.

Installation of input method dictionaries: This functionality will be provided primarily through the file system and the installation framework, although the present embodiment could be designed to include such a feature. How installation of input method dictionaries is done will be transparent to clients of the Input Method Dictionary classes.

Provide user interface editors and views. There are a number of tools needed to edit and view components like the command key mapping, user dictionary, etc.

Class and Method Description

This sections describe classes in the Input Method Framework. After an overview, it presents class diagrams for each category as well as description of each class. For the more interesting classes, the public and protected methods are also discussed.

Figure 8:
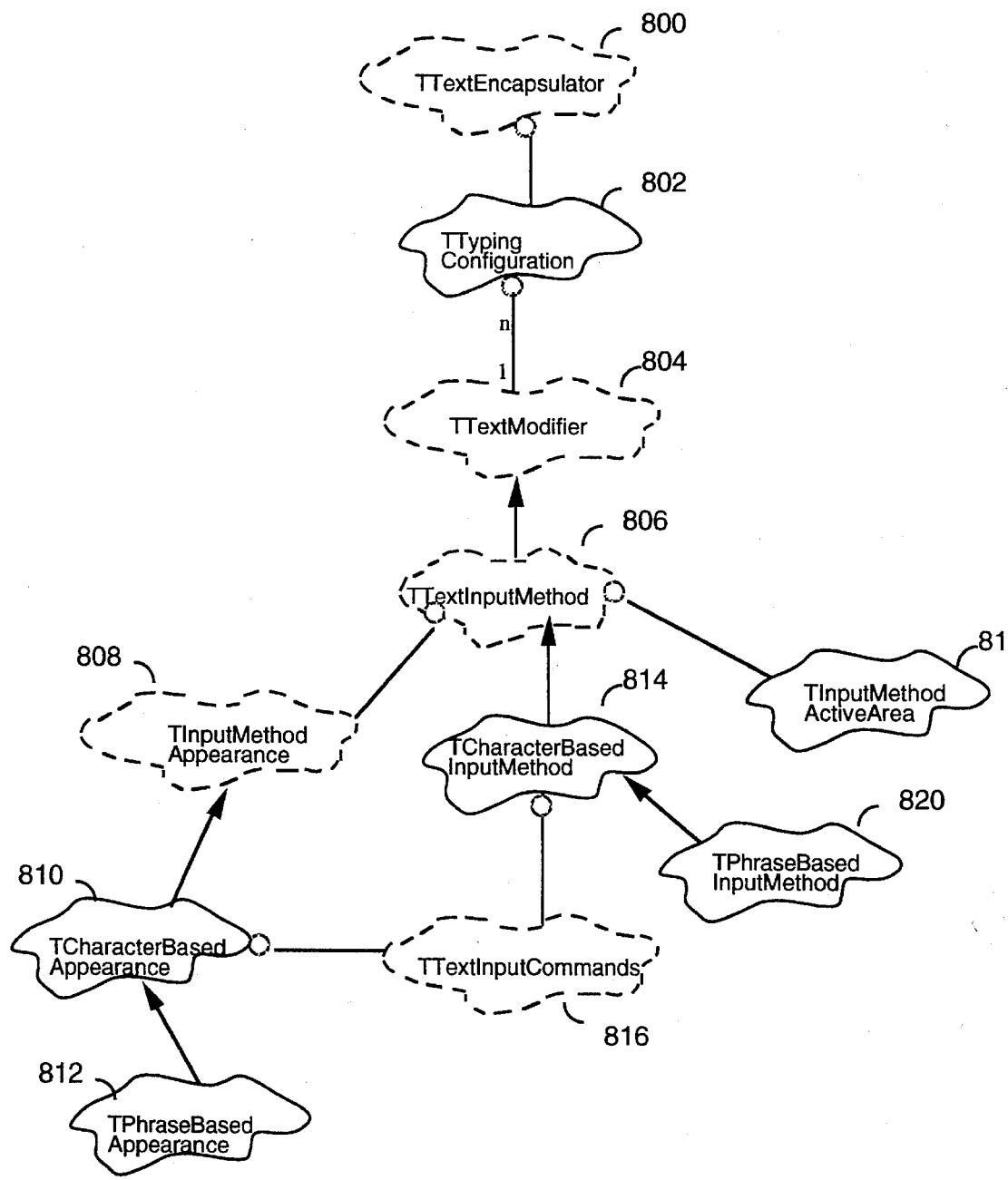
FIG. 8 is a Booch diagram showing the text input method classes.

Architecture Overview FIG. 8

The objects and relations among objects shown and discussed below are merely examples of the overall concept of the input method framework.

The clients for this framework are primarily input method developers, and a Typing Framework. Text editing classes may be interested in TTextModifier 804. Access to TTextModifier 804, however, should be through the TTypingConfiguration object 802. Access to TTypingConfiguration 802 is through TTextEncapsulator 800. The classes in this framework can be divided into the following categories:

Text Input Method Classes: These classes implement the input method user interface. They work in conjunction with Text Frameworks to handle user events and to modify the text object.

TTextModifier 804

TTextInputMethod 806

TCharacterBasedInputMethod 814
TPhraseBasedInputMethod 820
TTransliterator
TTextInputMethodCommand
TExplicitConversionCommand
TUnconvertCommand
TSelectNextPhraseCommand
TSelectPreviousPhraseCommand
TBreakApartPhraseCommand
TMergePhraseCommand
TConfirmCommand
TInputMethodAppearance 808
TCharacterBasedAppearance 810
TPhraseBasedAppearance 812

Conversion Engine Classes: These classes define and implement conversion engines.

TInputMethodConversionEngine
TChineseConversionEngine
TKoreanConversionEngine
TSJIPConversionEngine Dictionary Classes: These classes define and implement input method dictionaries.

TInputMethodDictionary
TInputMethodDictionarySurrogate
TInputMethodDictionaryIterator
TInputMethodDictionaryKey
TInputMethodDictionaryEntry
TInputMethodDictionaryEntryIterator Active Area Classes: These classes store and manipulate component information in active areas.

TInputMethodPhrase
TInputMethodPhraseSequence
TInputMethodActiveArea 818

User Interface Utility Classes: These classes implement some of the user interface elements for input methods. They can be used as is, or subclassed to customize behavior.

TInputMethodEventMap
TAlternateInputSource
  TViewBasedAlternateInputSource
TOptionSelector
  TTrackerBasedSelector
  TViewBasedSelector Text Input Method Classes TTextModifier 804

TTextModifier 804 is an abstract base class that defines the interface for filtering events from text application. All linguistic services that are invoked at the time of text entry should descend from this class.

Command Objects: TTextModifier 804 should update the model with command objects. Multiple commands can be grouped by TModelCommandGroup to define a single undoable unit. Similarly, if screen updates should not occur until several related commands have all finished executing, these commands should also be grouped into a single unit.

Interactive modifiers: A text modifier is interactive if it requires user intervention. For example, transliteration always has a deterministic result and is not an interactive modifier, where input methods or spell checkers typically require the user to select among a list of alternatives.

Chaining modifiers and relationship with the Typing Framework: Modifiers can be grouped into an ordered list. This list can be used as a single unit by the text editing client. Modifier lists are controlled by and accessed through, for example, a Typing Framework's TTypingConfiguration objects. We restrict each chain to contain only a single interactive modifier. In general, text editing classes should not use a modifier directly, but through the TTypingConfiguration object 802. It is also possible that multiple interactive modifiers such as input methods could be allowed. It is also possible to provide direct use of the modifier by the user.

TTextInputMethod 806

TTextInputMethod 806 derives from TTextModifier 804 and defines the abstract protocol for all input method implementations. It is responsible for the user interface of input method, e.g, user input, option selection, or text appearance. It is not responsible for the actual conversion. This separation allows us to use the same UI for multiple conversion engines. This class is responsible for services that are common to all input methods. These features include:

User Event Mapping: TTextInputMethod 806 uses a sub-object, TInputMethodEventMapping, to interpret events. This feature allows users to easily customize command mapping. Each event is mapped to a TInputMethodCommand object that implements the requested action.

Appearance of the Active area: TTextInputMethod 806 uses a sub-object, TInputMethodAppearance 808, to define the visual appearance of the active area. The text classes have no knowledge of the different states during input. Styles (or attributes) are used to distinguish the active area. Each type of text displayed, e.g., raw, converted or confirmed, has a distinct style.

Coordinating multiple active areas: The active area information is kept with the model so that it stays in sync. Each model can contain multiple active areas, where the current area corresponds to the current selection. This class is responsible for getting the current area for its subclasses.

Coordinating multiple input methods: The input method classes work in conjunction with the Typing Framework to coordinate multiple input methods. Each input method is responsible for updating the model when it is active, and for reconstructing its internal states from the model when reactivated. This support allows input methods to be freely mixed without losing context information. A special case arises when the user switches typing configuration from one with an input method to one without. The second configuration is still responsible for updating the active area consistently by using a "null" input method.

TPhraseBasedInputMethod 820

TPhraseBasedInputMethod 820 is a concrete subclass of TCharacterBasedInputMethod 814. It implements the default user interface for phrase-based input methods. It implements functionality specific to a phrase based method such as changing phrase boundaries.

Input Method Command Classes
TInputMethodCommand

TInputMethodCommand descends from TModelCommand. It is an abstract base class for all input method commands. Each operation (ie., opening an option window) should be a concrete subclass of TInputMethodCommand.

Typically, a single TInputMethodCommand issues one or more other commands. These commands are put into a TModelCommandGroup and treated as a single undo unit. Developers may subclass to encapsulate other information it needs for undo by overriding the HandleUndo()/Redo() methods.

TInputMethodCommand objects are created by a TTextInputMethod 806. They use a TInputMethodAppearance object 808 to build the text inserted into the model.

There is a one-to-one correspondence between the commands and events initiated by the user such as down-shift key to open option window. The following concrete subclasses are used by TTextInputMethod:

TExplicitConversionCommand: Get the best-guess conversion from the engine and update the text model.

TUnconvertCommand: Given the current phrase, updates the model by replacing the converted text with raw text. Note that this feature is provided in addition to undo so the user can unconvert any arbitrary phrase, and does not need to traverse the command stack.

TSelectNextPhraseCommand: Highlights the next phrase, which becomes the current phrase.

TSelectPreviousPhraseCommand: Highlights the previous phrase, which becomes the current phrase.

TBreakApartPhraseCommand: Change the phrase boundary by breaking the current phrase into two.

TBreakAndConverthraseCommand: Change the phrase boundary by breaking the current phrase into two and attempt to convert. Updates the model with the new conversion.

TMergePhraseCommand: Change the phrase boundary by merging the current phrase with the one adjacent to it.

TMergeAndConvertPhraseCommand: Change the phrase boundary by merging the current phrase with the one adjacent to it and attempt to convert. Updates the model with the new conversion.

TConfirmCommand: Removes active area styles from the text model.

TInputWindowCommand: Creates a separate input window. When the user indicates that he is finished with input, updates the model with text in the input window.

TSelectOptionCommand: Concrete base class for the command used to select homophone options. Given the current phrase, allows the user to select options directly in the document.

TSelectOptionInViewCommand: TSelectOptionInViewCommand is a concrete subclass of TSelectOptionCommand. It uses a TViewBasedSelector to select options in a separate view. Updates the model when the selection is confirmed.

4. Active Area Appearance Classes
TInputMethodAppearance 808

TInputMethodAppearance is an abstract base class that defines the protocol for specifying the active area appearance, something that is highly specific to each product. It is anticipated that most developers will provide their own subclass objects. This object contains a collection of TStyleSets (to become TAttributeGroup), each corresponds to a phrase state (ie., converted, unconverted, etc.)

TCharacterBasedAppearance 810

This is a concrete subclass used in conjunction with TCharacterBasedInputMethod. It implements a character based appearance, that is, the boundary between phrases is not delineated. If system-defined styles are not sufficient for this purpose, we may also supply some specialized input method styles. Specific styles could be supplied via inheritance or through data.

TPhraseBasedAppearance 812

This is a concrete subclass of TCharacterBasedAppearance 810, and is used in conjunction with TPhraseBasedInputMethod 820. It implements a phrase based lo appearance, that is, the boundary between phrases is delineated through special styles.

Figure 9:
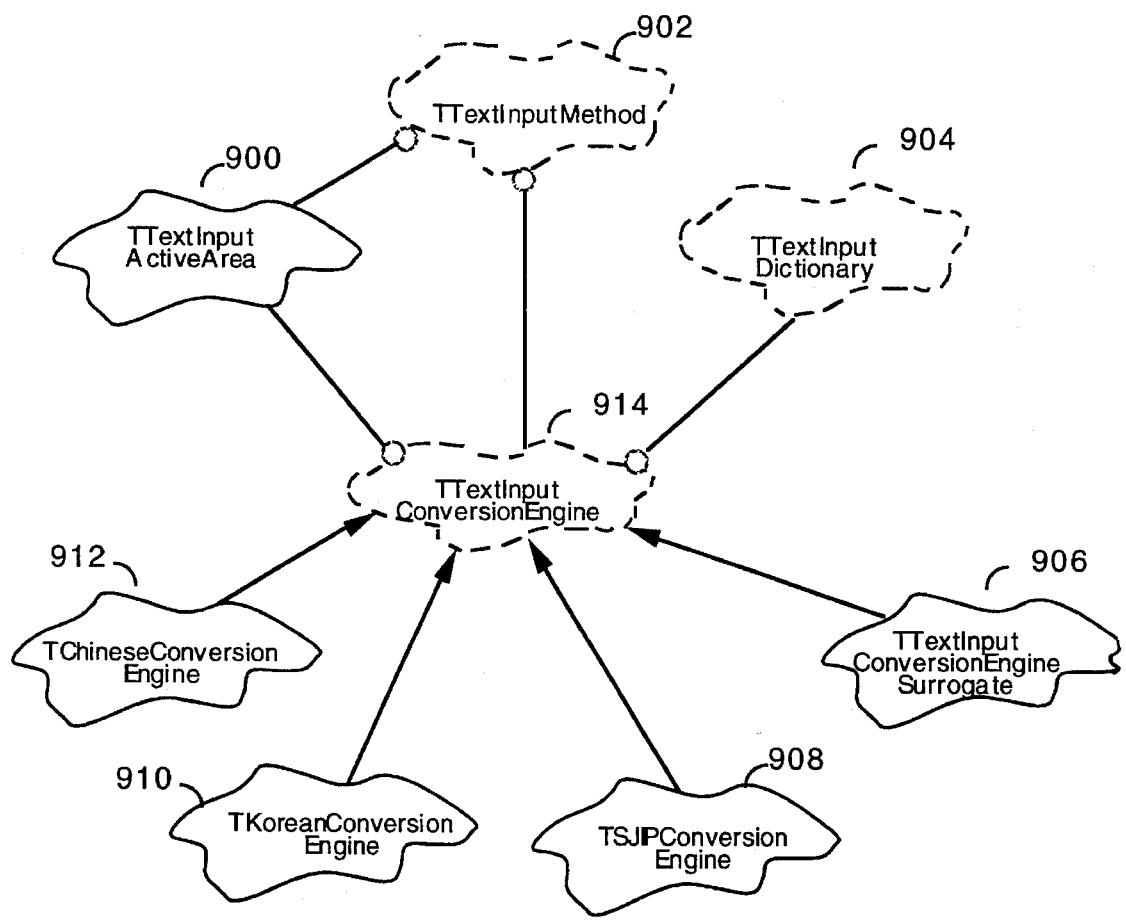
FIG. 9 is a Booch diagram illustrating the conversion classes.

Conversion. Engine Classes FIG. 9
TTextInputConversionEngine 914

TTextInputConversionEngine 914 defines the protocol for converting data. It is the abstract base class for all input method conversion engines. Different engine objects can be used with the same TTextInputMethod 902. The engine uses the active area 900 passed into the Convert() method to help with the conversion. Note that while the conversion result could change portions of the active area if new input provided additional context, the engine never updates the area directly. Instead, TTextInputMethod 902 uses the conversion result in its command objects to update the model and the active area at the same time.

Figure 10:
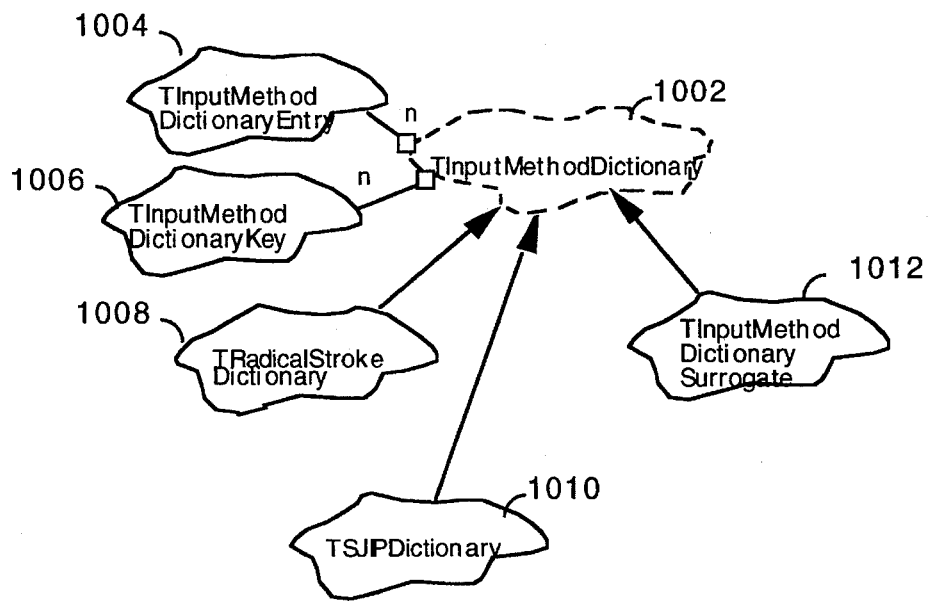
FIG. 10 is a Booch diagram illustrating the dictionary classes.

TTextInputDictionary 904 is discussed in greater detail with respect to FIG. 10.

TTextInputConversionEngineSurrogate is a concrete class that provides a light-weight mechanism for clients to access a TTextInputConversionEngine 914.

TSJIPConversionEngine 908: TSJIPConversionEngineTask is a wrapper object for the SJIP 3.0 Japanese input method product, our system default Japanese input method.

TChineseConversionEngine 912: TChineseConversionEngine is a wrapper object for our system default Chinese conversion engine.

TKoreanConversionEngine 910: TKoreanConversionEngine is a wrapper object for our system default Korean conversion engine.

Dictionary Classes

TInputMethodDictionaryKey 1006 is a concrete class used to lookup entries in an input method dictionary. Each key contains a component TText and optional properties (grammar, etc.). The properties allow the client to specify more precise conditions for queries. This is particularly useful in separating homophone options. The standard set of properties are the TTokens defined in TInputMethodDictionary 1002. Properties contained in a key need not be mutually exclusive. Properties are shared between the TInputMethodKey and TInputMethodEntryClasses.

The dictionary key will also allow the specification of other search criteria, including the regular expression specification.

Particular dictionaries may want to subclass from TInputMethodDictionaryKey 1006. For example, a subclass, TRadicalStrokeDictionaryKey 1008, adds the ability to get and set the components (radical and stroke) as separate numeric values.

TInputMethodDictionaryEntry 1004 is a concrete class used to represent an entry in the dictionary. Each entry contains a TText result and properties. While most dictionaries will not actually store their data in this format, the protocol in this class defines the least common denominator for what each entry should contain. Particular dictionaries may want to subclass from TInputMethodDictionaryEntry 1004.

TInputMethodDictionaryEntryIterator is a concrete class used to traverse the entries in a dictionary. The primary clients will be a dictionary editor.

TInputMethodDictionary 1002

TInputMethodDictionary 1002 is an abstract class and defines the protocol for all input method dictionaries. It does not provide any implementation. This protocol includes methods for looking up, adding, and deleting entries. In addition, each dictionary contains a name (TLocalName), a category (main, user, specialized), name of the input method for which the dictionary is optimized, language (Japanese, Chinese, Korean, etc.) and possible an input component type. It serves as base class for all input method dictionaries, and should act as a wrapper object for all ported dictionaries Properties: Queries can be modified by properties. Properties (especially grammatical properties) can be used to determine the best fit among multiple entries.

Reverse mapping: This class includes protocol for reverse mapping from result to component form. Reverse mapping is an alternative way to retain component information without attaching any additional data to the document. The conversion engine can reconstruct the context it needs by looking up the component text phrase by phrase. Note that this ability comes at the expense of increasing the dictionary size. Furthermore, some results cannot map to a component form (although for the vast majority of cases this is not a problem).

Data Sharing: Since these dictionaries can be very big, the data needs to be shared by different teams. A framework for sharing will be developed as part of the dictionary design.

TInputMethodDictionarySurrogate 1012 is a concrete class that provides a light-weight mechanism for clients to access a TInputMethodDictionary 1002. Its semantic is explicit master with multiple surrogates.

TStandardTextInputDictionary 1010 is our default implementation of input method dictionary. It is a subclass of TInputMethodDictionary 1002 and has a TDiskDictionary. This hardware independent class will be optimized for input methods use. It is used for all user dictionaries, and developers of new input method dictionaries should use this class directly so they can benefit from future enhancements.

TInputMethodDictionaryGroup

Input method dictionaries may be chained. For example, one may wishes to have a personal dictionary followed by a medical one, with the generic dictionary as last in the group. TInputMethodDictionaryGroup is responsible for managing the chain, and allows clients to look up entries in all of the dictionaries in the group. This class is intended to be used directly and not as a subclass.

Figure 11:
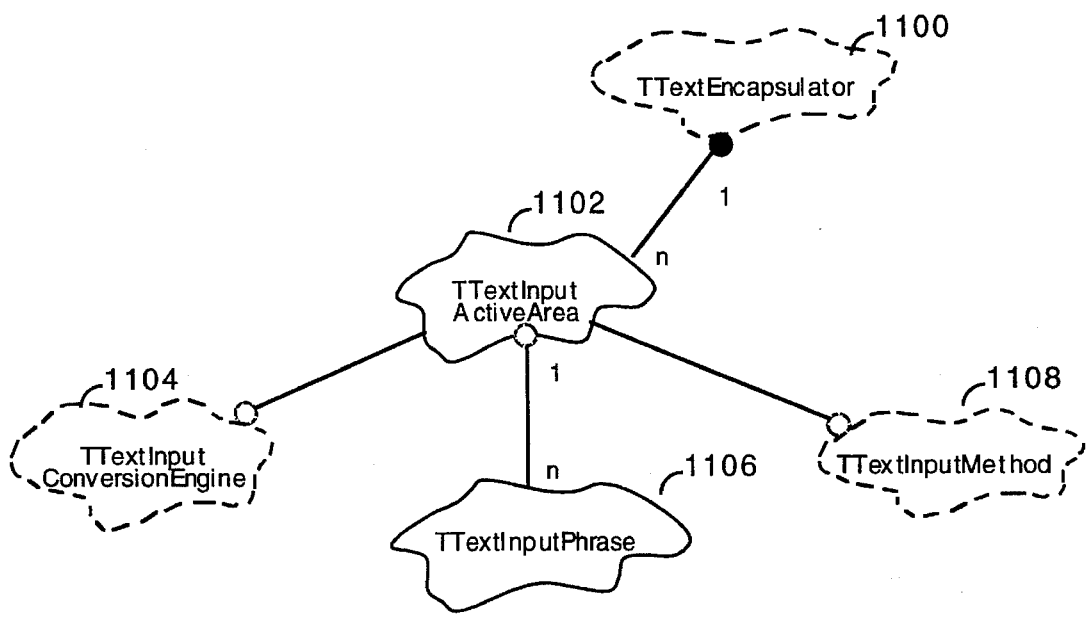
FIG. 11 is a Booch diagram of the active area classes.
Figure 12:
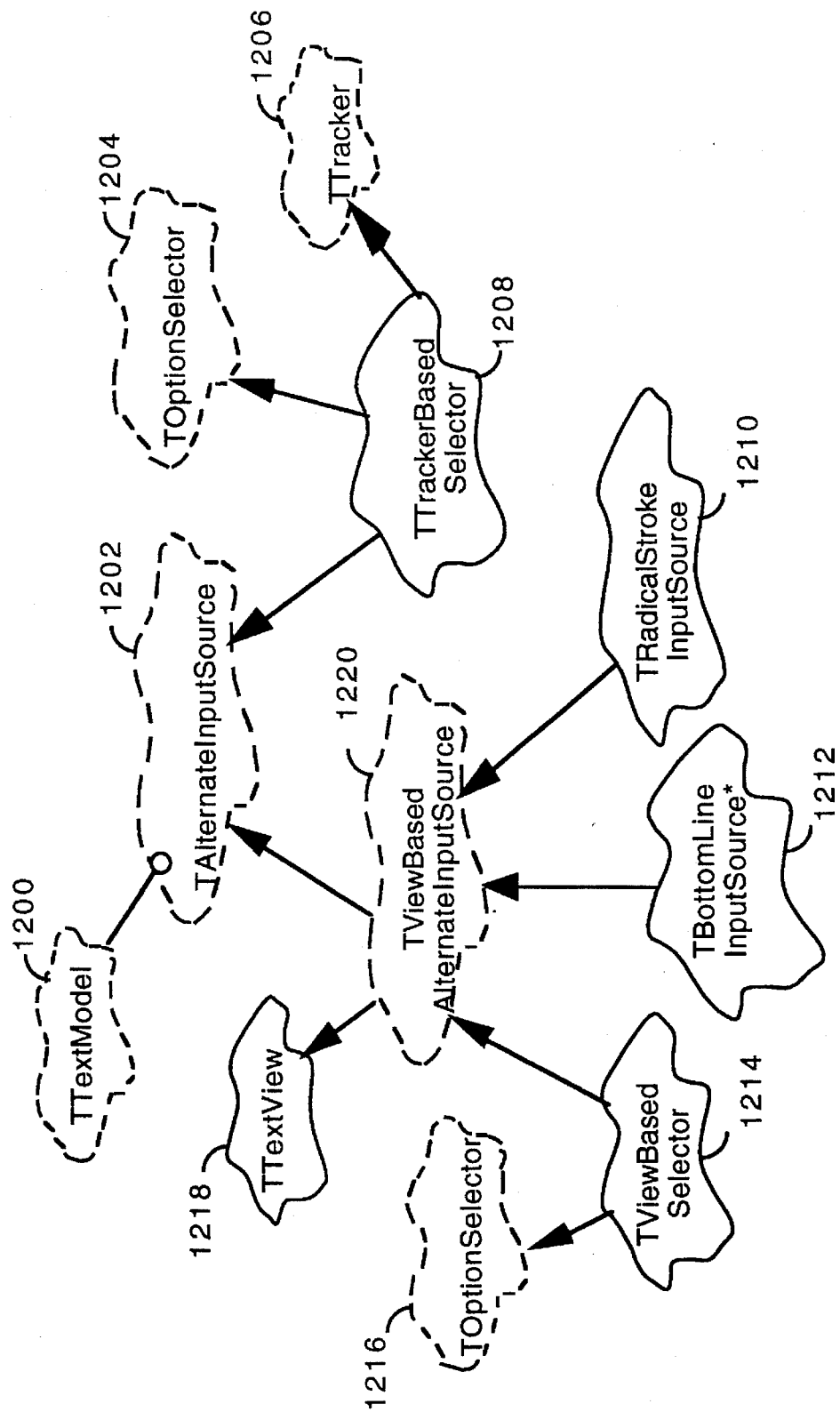
FIG. 12 illustrates alternate input sources.

Active Area Classes FIG. 11

TTextInputConversionEngine 1104, TTextInputActiveArea 1102, and TTextInputMethod 1108 have been discussed previously with respect to FIG. 9. TTextEncapsulator 1100 has been discussed previously with respect to FIG. 8.

TTextInputPhrase 1106

TTextInputPhrase 1106 encapsulates the information about a phrase (aka clause or bunsetu), mainly the component and result text, and the phrase state. It also contains information necessary to reconstruct the context (e.g., part of speech).

Phrase state: A phrase can be in one of several states defined by a TToken:

Converted: The phrase has been converted, and the conversion has been incorporated into the document.

Manually converted: The phrase was manually adjusted by the user, and the engine should not attempt any further conversions.

Unconverted: The user issued an "undo" or chose the "Unconvert" operation and has returned the text into component form.

Deleted: The phrase has been deleted by the user.

User Interface Utility Classes

TInputMethodEventMap

This class translates user events into input method operations. It maps a TEvent object to the TInputMethodCommand object that should be invoked. Developers can add new actions by defining a new command objects, and register the event and command in the TInputMethodEventMap. Although most of the events in this object are TKeyEvents, the interface is generalized to all subclass of TEvent. This class is designed to be used directly and not as a base class; it is used internally by TTextInputMethod and its subclasses. In the future, there will be an editor for this object.

Alternate Input Source Classes

TAlternateInputSource 1202

Input methods often takes input from sources other than the document. For example, input can come from a "bottom-line input" window, a graphical radical-stroke composition utility, or from the homophone option selector. TAlternateInputSource 1202 is an abstract base class for these objects. It provides methods to update the target text model for its subclasses. The source of input can be either view-based (i.e.., bottom-line input), or some other mechanism (i.e.., the tracking homophone selector). While a TAlternateInputSource 1202 object is active, it becomes the current target, and the text model will not receive any user events.

TViewBasedAlternateInputSource 1220 is an abstract base class for view-based alternate input sources. It descends from TAlternateInputSource 1202 and TTextView 1218. Some possible subclasses of TViewBasedAlternateInputSource 1220 are bottom line input, graphical radical stroke input method, and homophone selection in a window.

TOptionSelector 1204 is an abstract base class for managing conversion options (most typically homophones). This class defines the protocol for processing option, and it is up to its subclasses to supply the appearance. For example, options can be displayed in a separate window, in a pop-up menu, a list-view, or inline with the text.

TTrackerBasedSelector 1208 descends from TOptionSelector 1204, TAlternateInputSource 1202, and TTracker 1206. It implements in-document option selection.

TViewBasedSelector 1214 descends from TOptionSelector and TViewBasedAlternateInputSource. It implements option selection in a separate window.

---

Examples and Tutorials

---

Using the Input Method Dictionary Classes
TInputMethodDictionaryIterator* dictionaryIterator =
    TInputMethocDictionary::CreateIterator();
TInputMethodDictionarySurrogate* dictionary =
    dictionaryIterator->First();
Boolean found;
TToken kJapanese("Japanese");
TToken dictLanguage;
while (dictionary && !found)
{
    dictionary->Language(dictLanguage);
    if (dictLanguage == kJapanese)
        foung = TRUE;
    else
        dict = dictionaryIterator->Next();
}
//    . . . . Later
//    Dictionary lookup
TText componentText(L"はる"); // When the compiler supports it
TInputMethodDictionaryKey key;
key.SetComponent(componentText);
TArray options;
TArray nouns;
dict.LookupOptions(key, options);
//    options now contains entries with results:
//        1. 春 2. 張る 3. 晴 4. 貼る
key.AddProperty(TInputMethodDictionary::kNoun);
key.Filter(options, nouns);
//    nouns contains
//        1. 春
key.AddProperty(TInputMethodDictionary::kProperNoun);
key.Filter(options, nouns);
//    nouns now contains
//        1. 春 2. 晴
TInputMethodDictionaryIterator entryIterator(dictionary);
TInputMethodDictionaryEntry* entry;
//    Set the iterator to look at all the verb entries with
//    the component はる.
key. RemoveProperty(TInputMethodDictionary::kNoun);
key.RemoveProperty(TInputMethodDictionary::kProperNoun);
key.AddProperty(TInputMethodDictionary::kVerb);

---

Examples and Tutorials

--- entryIterator.SetIteratorAt(key);
while (entryIterator.IsValid())
{
    entry = entryIterator.CurrentAndIncrement();
//    do something to the entry
}

---

Scenarios

This section uses various figures to outline a few interesting scenarios. The description is a rough sketch of the sequence of events, and is not meant to be comprehensive. TTextInteractor 1300 detects events from the user. TTypingConfiguration 1302 determines what modifier group should be used. TTextInputMethod 1304 has been described above with respect to 806. TTextInputMethodRequestRegistry 1306 is a command created by the TTextInputMethod 1304. The TTextInputMethodRequestRegistry 1306 then creates the command object TTextInputMethodCommand 1310. TTextInputMethodCommand 1310 then updates the TTextEncapsulator 1308. The general flow of processing is discussed below.

Figure 13:
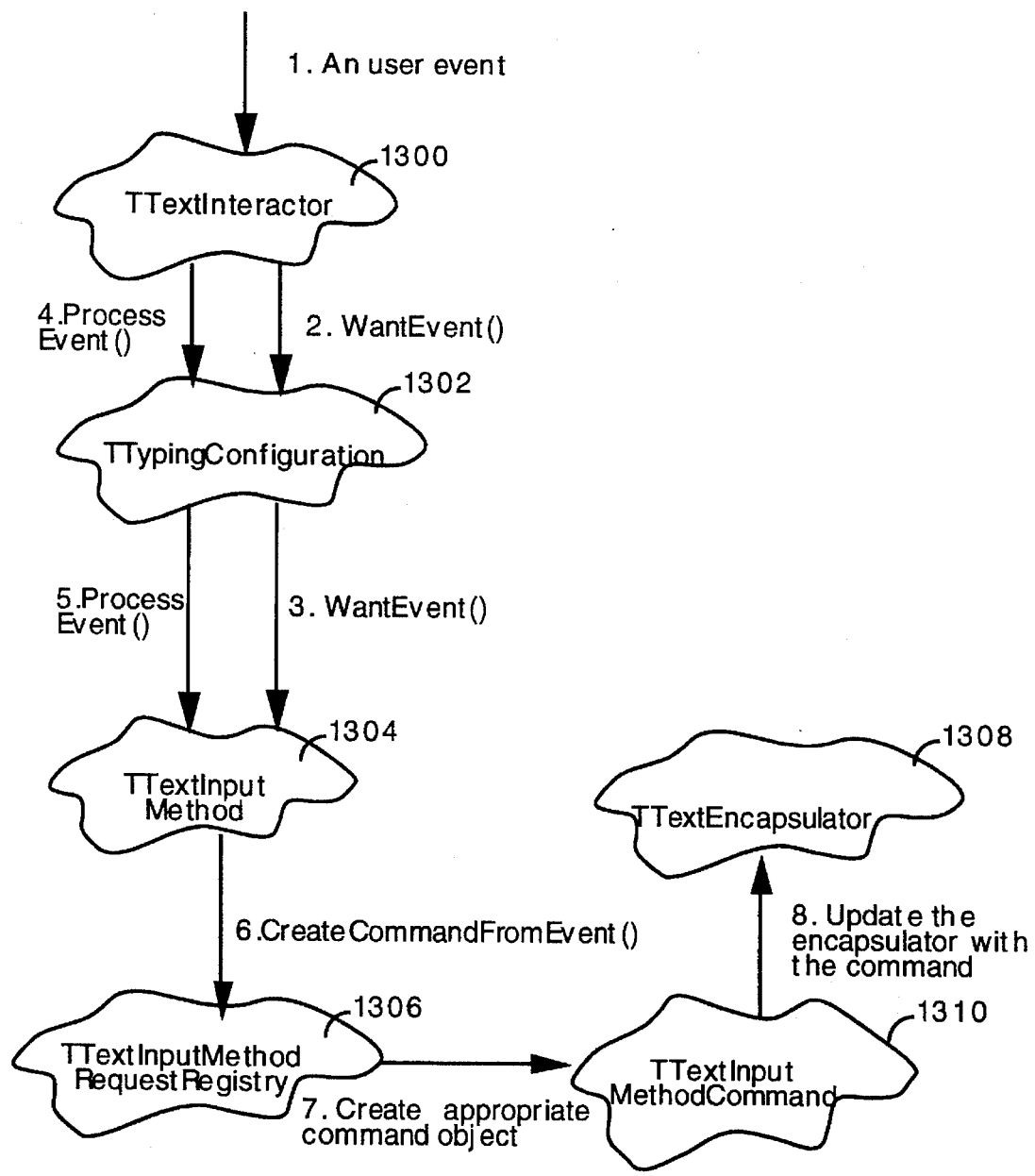
FIG. 13 illustrates processing an input method request.
Figure 14:
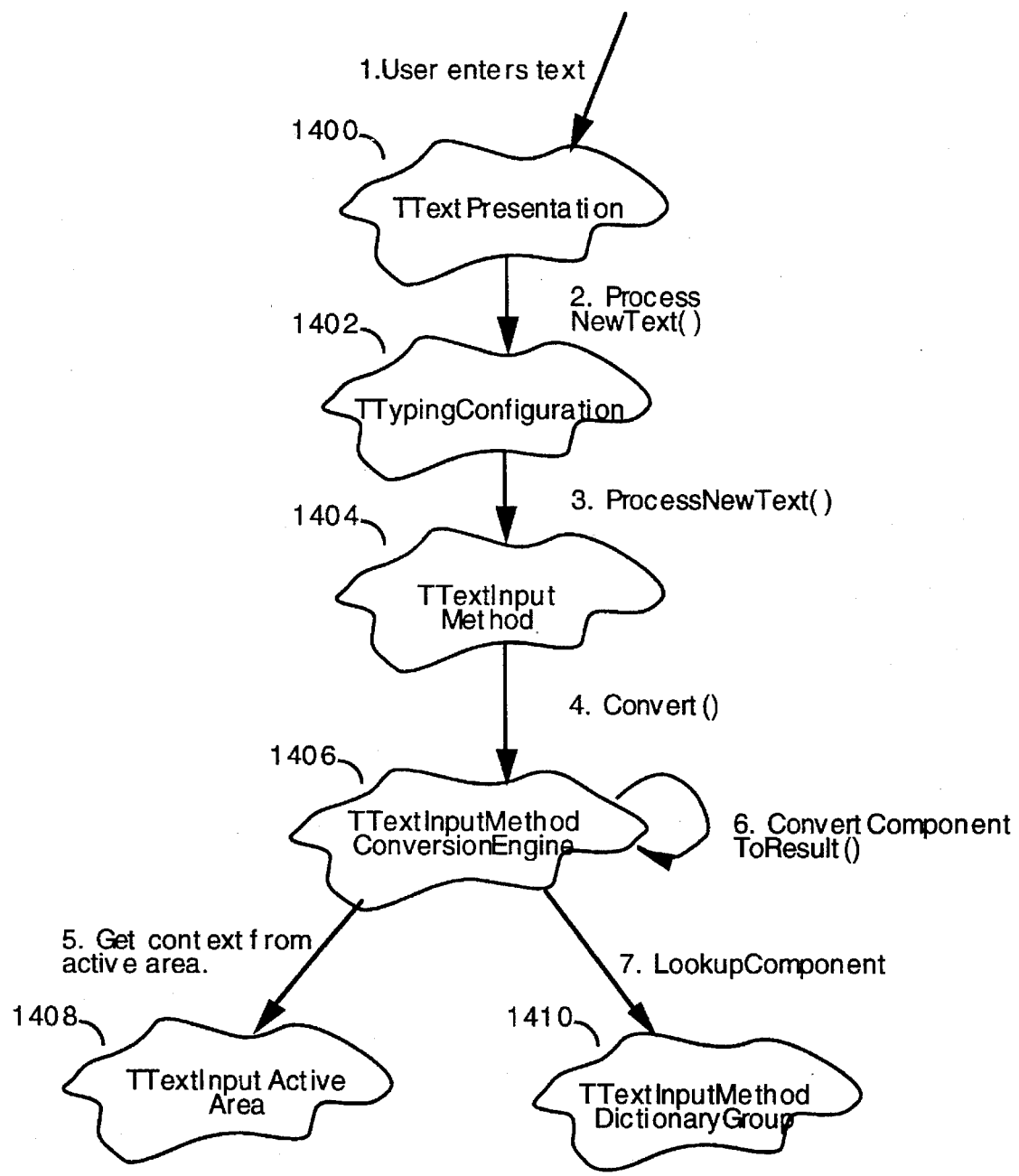
FIG. 14 is a Booch diagram showing processing of new text and conversion.

1. Processing an Input Method Request Event—FIG. 13

Filtering events (steps 1, 2, 3): Text presentation receive user events and filters them through current chain of TTextModifiers by calling TTypingConfiguration::WantEvent(). This method determines the correct modifier group, and iterates through the group calling each modifier's WantEvent() method. It returns TRUE if any modifier's WantEvent() returns TRUE.

Process event (steps 4, 5): If TTypingConfiguration::WantEvent() returned TRUE, TTextInteractor calls ProcessEvent(). This method will again iterate over the group calling each individual ProcessEvent().

Executing the input method command (steps 6, 7, 8): TTextInputMethod::ProcessEvent() uses TTextInputEventMapping to map the event to a particular request. It then creates the command object and updates the model.

2. Processing New Text and Conversion Results

Handle new text (steps 1, 2, 3): TTextPresentation 1400 buffers the keystrokes and passes the new text to the text modifiers through the typing configuration 1402. TTextInputMethod 1404 has been described above with respect to FIG. 8.

Component conversion (steps 4, 5, 6, 7): The input method 1404 calls the conversion engine 1406, which uses the active area 1408 for context information, and then looks up the new text in the dictionary 1410. If conversion is possible, return the result to the presentation which will update the encapsulator with a command.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A framework for creating input methods for converting input events corresponding to raw text elements, such as radicals, into converted text elements, such as ideograms, to be encapsulated in a model stored on a computing system and to be presented on a display of the computing system, the framework comprising:

input method classes, appearance classes, event mapping classes, and conversion engine classes, stored in the computing system;

means for creating an input method object, an appearance object, an event mapping object, and a conversion engine object, each from one of the respective classes;

wherein the appearance object includes logic for specifying how converted text and raw text should appear when displayed;

wherein the event mapping object includes logic for mapping keyboard events to raw text elements;

wherein the conversion engine object includes logic for converting raw text elements in a specified portion of the model into converted text elements; and wherein the input method object includes
  means for designating a portion of the model to be modified by input events as an active area;
  means for using the event mapping object to map keyboard events to a raw text element and for updating the active area with the raw text element;
  means for using the conversion engine object to convert raw text elements in the active area to converted text elements and for updating the model with the converted text elements; and
  means for presenting the model on the display such that the active area is distinctively presented in relation to the remaining portion of the model, and wherein the presenting means uses the appearance object to specify how converted text elements and raw text elements should be presented in the active area.

2. The framework of claim 1 wherein the input method classes includes a phrase based input method class that includes logic for updating the model on a phrase basis.

3. The framework of claim 2 wherein the input method class includes means for unconverting a phrase back to the raw text originally used to create the phrase.

4. The framework of claim 1 wherein the means for using the conversion engine includes means for providing alternate homophones identified by the conversion engine as corresponding to the raw text and for allowing the user to choose one of the alternate homophones as the converted text to update the model.

5. The framework of claim 1 wherein the means for using the conversion engine includes means for allowing the user to confirm the converted text provided by the conversion engine as proper before updating the model with the converted text.

* * * * *